United States Patent [19]
Maloney et al.

[11] Patent Number: 4,636,376
[45] Date of Patent: Jan. 13, 1987

[54] SULFATE REMOVAL FROM ALKALI METAL CHLORATE SOLUTIONS

[75] Inventors: Bernard A. Maloney, Canal Fulton; John E. Carbaugh, Akron, both of Ohio

[73] Assignee: PPG Industries, Inc., Pittsburgh, Pa.

[21] Appl. No.: 781,176

[22] Filed: Sep. 30, 1985

[51] Int. Cl.$^4$ .............................................. C01B 11/14
[52] U.S. Cl. .................................. 423/475; 423/183; 423/199; 204/95; 210/702; 210/723; 210/724; 210/726; 210/737
[58] Field of Search ............... 210/702, 712, 720, 723, 210/724, 726, 737, 913; 204/94, 95; 423/166, 193, 475

[56] References Cited

U.S. PATENT DOCUMENTS 3,846,081  11/1974  Dean et al. ............................ 23/297
3,970,528  7/1976  Zirngiebl et al ....................... 423/193
4,132,759  1/1979  Schäfer ................................. 423/161

FOREIGN PATENT DOCUMENTS 951643  3/1964  United Kingdom .

Primary Examiner—Richard V. Fisher
Assistant Examiner—Jeffrey W. Peterson
Attorney, Agent, or Firm—Bruce H. Cottrell

[57] ABSTRACT

A process for the removal of essentially chromium-free sulfate from a chromate and sulfate-containing chlorate liquor which includes mixing the chlorate liquor having a pH of between about 2.0 and 6.0 with a calcium-containing material at a temperature and for a time sufficient to form a sulfate-containing precipitate predominantly of glauberite, $Na_2Ca(SO_4)_2$, and separating the substantially chromium-free glauberite from the chlorate liquor.

18 Claims, No Drawings

SULFATE REMOVAL FROM ALKALI METAL CHLORATE SOLUTIONS

BACKGROUND OF THE INVENTION

The present invention relates to a process of removing sulfate, i.e., sulfate anions, from aqueous alkali metal chlorate solutions containing chromate and sulfate. More particularly, this invention relates to the removal of sulfate from aqueous chromate-containing sodium chlorate solutions without simultaneous removal of significant quantities of chromate.

Aqueous alkali metal chlorate solutions, e.g., sodim chlorate solutions, are conventionally produced by electrolysis of alkali metal chloride brines in electrolytic cells, usually bipolar electrolytic cells. A cell liquor containing both the alkali metal chlorate and alkali metal chloride is recovered from the cells. It is conventional to add chromate, e.g., sodium dichromate, to the solution in the cell, because chromate improves the current efficiency of the cell during conversion of sodium chloride to sodium chlorate. By the term "chromate" is meant a chromium-containing species such as a chromate ion ($CrO_4^=$), a monobasic chromate ion ($HCrO_4^-$) or a dichromate ion ($Cr_2O_7^=$), the particular species being determined primarily by the pH in the solution.

The alkali metal chloride brine used as feed for these cells can be obtained by dissolving solid salt, for example, by solution mining of rock salt. Brine formed from dissolving solid salt can contain various impurities including sulfate salts. While complete removal of sulfate from the brine is unnecessary, electrolysis of brine having sulfate levels above 25 grams per liter (g/l) can damage the anode coatings. In a typical process for producing the alkali metal chlorate, the cell liquor is recovered from the cell, a portion of the alkali metal chlorate product is crystallized and separated from the liquor, the liquor is resaturated with alkali metal chloride and the liquor is then recycled to the electrolytic cell. Without removal of some sulfate, sulfate levels would rise above acceptable levels. Sulfate levels may be reduced to acceptable levels by adding calcium chloride to precipitate calcium sulfate. Such sulfate removal can be achieved by treatment of a sidestream of the aqueous chlorate liquor. It has been found that chromate ions within the chlorate liquor tend to precipitate with the calcium sulfate. Such precipitation can result in calcium sulfate precipitates having chromium levels in the range of several thousand parts per million (ppm). It is desirable to minimize the chromium level in the sulfate-containing precipitate thereby reducing toxic waste problems with the precipitate.

SUMMARY OF THE INVENTION

It has now been discovered that sulfate can be removed from an alkali metal chlorate liquor without removing substantial quantities of chromium. In accordance with that discovery, sulfate anions are removed in the form of the double salt glauberite, $Na_2Ca(SO_4)_2$. In an embodiment of the process of this invention a chromate and sulfate-containing chlorate liquor having a pH in the range of from about 2.0 to about 6.0 is mixed with a calcium-containing material for a time and at a temperature sufficient to form a glauberite precipitate, and separating the glauberite precipitate from the chlorate liquor.

In another embodiment of the present process, the chromate and sulfate-containing chlorate liquor having a pH in the range of about 2.0 to about 6.0 is mixed with a calcium-containing material to precipitate a portion of the contained sulfate as both a glauberite and a non-glauberite species, the precipitate and the chlorate liquor are maintained for a time and at a temperature sufficient to substantially convert the non-glauberite species to the glauberite species, and the glauberite species separated from the chlorate liquor.

DETAILED DESCRIPTION OF THE INVENTION

Alkali metal chlorates can be produced by the electrolysis of alkali metal brine in a variety of electrochemical cells. Typical alkali metal chlorates include sodium chlorate, potassium chlorate, lithium chlorate, rubidium chlorate, cesium chlorate and mixtures thereof. Since sodium chlorate is the most commonly produced chlorate, the invention will be further described with particular reference to sodium chlorate. However, it is to be recognized that sulfate can be removed from other chlorates in the same manner by the present invention.

A typical chemical analysis of an aqueous sodium chlorate liquor from a typical sodium chlorate cell shows the following ranges: sodium chlorate from 100 to 750 g/l, sodium chloride from 20 to 400 g/l, sodium sulfate from 0.1 to 25 g/l, and sodium dichromate from 0.1 to 20 g/l. Greater or lesser concentrations of the salt components described above may be present in aqueous sodium chlorate liquor. In addition, other minor components, e.g., alkali metal hypohalites such as sodium hypochlorite, may also be found in sodium chlorate cell liquor.

In the process of electrolyzing sodium chloride brine to form sodium chlorate, a resultant sodium chlorate liquor is withdrawn from the electrolytic cell and passed to holding tanks wherein hypochlorite is chemically converted to chlorate. A crop of sodium chlorate is crystallized by cooling the liquor and separated from the chlorate liquor. The chlorate-lean liquor is then resaturated with sodium chloride and recycled to the cell. The addition of solid sodium chloride to resaturate the chlorate liquor can introduce a variety of impurities into chlorate cycle, including alkaline earth metal cations such as calcium and magnesium and other impurities such as sulfate. Calcium and magnesium are conventionally removed from any chlorate cell feed solution prior to entry into the cell by precipitation with sodium hydroxide and sodium carbonate. While sulfate impurities (sodium sulfate) can be present throughout the chlorate process, periodic removal of sulfate is necessary to keep the sulfate concentration under 25 g/l, generally between about 10 to 25 g/l. Sulfate concentrations greater than 25 g/l can adversely affect the lifetime of the catalytic coating upon the anode.

Sulfate can be removed via a chlorate liquor sidestream from the process cycle by the addition of a calcium-containing material, e.g., a calcium compound. The addition of calcium can result in the formation of a number of crystalline materials. For example, calcium sulfate can precipitate as $Ca(SO_4)$ (anhydrous calcium sulfate), $Ca(SO_4).2H_2O$ (gypsum), $Ca(SO_4).0.5\ H_2O$ (bassanite) or other calcium sulfate hydrates.

Unfortunately, these crystalline forms of calcium sulfate are readily contaminated with substantial amounts of chromate. This may be due to chromate ions being isomorphic with the sulfate ions in the sodium chlorate cell effluent, i.e., the same size and structure. This can result in coprecipitation of chromate within the calcium sulfate crystal structure. Such a coprecipitation is sometimes described as a mixed crystal or a solid solution.

While calcium addition can result also in the precipitation of a double salt such as glauberite, $Na_2Ca(SO_4)_2$, it has now been discovered that the formation of glauberite results in the coprecipitation or occlusion of significantly less chromate ion than other crystalline forms of calcium sulfate. By removing sulfate from the chlorate liquor as the double salt, glauberite, chromium levels in the precipitate are minimized. The precipitate may be substantially chromium-free, i.e., contain chromium in a concentration of less than about 300 ppm and more preferably less than about 100 ppm. The glauberite precipitate can then generally be disposed of without presenting a toxic waste problem. A further advantage of the present invention is that, avoiding removal of chromate anions with sulfate anions reduces the make-up requirements of sodium dichromate in the chlorate liquor. Thus, an economic savings can be achieved.

In the process of this invention, the pH of a sulfate-containing chlorate liquor stream is within the range of from about 2.0 to about 6.0, preferably from about 2.0 to about 5.5, most preferably from about 4.0 to about 5.5. Low pH of about 1.0 to 2.0 can result in the production of potentially explosive chlorine dioxide. Yet, low pH favors formation of the dichromate ion and the monobasic chromate ion, rather than the chromate ion. The dichromate ion and the monobasic chromate ion are not isomorphic with the sulfate ion and will not tend to coprecipitate into a mixed crystal or solid solution. The pH range of from about 4.0 to 5.5 is most preferable so that less chromate ion is present and no significant chlorine dioxide is produced.

The pH of the chlorate liquor can be controlled to within the desired range by the addition of any typical inorganic acid or base. Typical inorganic acids includes hydrochloric acid, sulfuric acid, phosphoric acid, nitric acid, mixtures thereof and the like. Typical bases include: sodium hydroxide, potassium hydroxide and ammonium hydroxide. Hydrochloric acid is the preferred inorganic acid. Sodium hydroxide is the preferred base.

Following any pH-adjustment, a sulfate-containing chlorate liquor having the pH within the above described ranges is treated with a calcium-containing material. The calcium-containing material is mixed with the sulfate-containing chlorate liquor and maintained at a temperature and for a time sufficient to form glauberite. While other sulfate-containing species may be present in minor amounts in the precipitate, glauberite is the predominant sulfate-containing species within the precipitate. The calcium-containing material can be any water soluble calciium compound, calcium complex or other form of calcium which is capable of releasing calcium ions into the chlorate liquor stream. For example, the calcium-containing material can be a calcium compound such as calcium chloride, anhydrous calcium sulfate, calcium sulfate dihydrate (gypsum), or calcium carbonate. Gypsum is a slow dissolving material which can be added as a solid and slowly dissolved to provide the calcium ions.

The temperature of the chlorate liquor stream during treatment with the calcium-containing material can be generally between about 40° Centigrade (C.) to 95° C., preferably between about 50° C. to 85° C. and most preferably between about 60° C. and 75° C. The calcium-containing material and the chlorate liquor stream can be maintained at the desired temperature for a time sufficient to form predominantly the glauberite salt as the sulfate-containing precipitate. The addition of a calcium-containing material to the chlorate liquor may initially form a mixture of glauberite and nonglauberite species. The nonglauberite species can include calcium sulfate species such as anhydrous calcium sulfate, bassonite and other calcium sulfate hydrates. The mixture of the chlorate liquor and calcium-containing material can be maintained at the desired temperature for a period of time sufficient to allow the nonglauberite species to redissolve and convert to glauberite. Generally, the mixture can be maintained at the desired temperature for from about 2 to 24 hours, more preferably for at least 4 hours, to obtain glauberite, although other time lengths can be selected.

After glauberite has become the predominant sulfate-containing species within the precipitate, the precipitate can be removed from the chlorate liquor. Removing the sulfate from the chlorate liquor in the form of glauberite minimizes the removal of chromate ions. A reduction of chromate ion coprecipitation is thus accomplished by mixing the chlorate liquor having a pH between about 2.0 and about 6.0, preferably between about 2.0 and about 5.5, most preferably between about 4.0 and about 5.5 with the calcium-containing material at a temperature and for a time sufficient to form predominantly glauberite as the sulfate-containing precipitate. The sulfate removal process of this invention reduces the need of additional sodium dichromate for the chlorate liquor stream. Disposal of the precipitated sulfate is more convenient with reduced chromium contamination.

The chlorate liquor from which sulfate is to be removed will generally contain between about 8 and 25 g/l of sodium sulfate, the upper limit imposed by chlorate cell anode performance. Sulfate removal is generally unnecessary below sulfate concentrations of 8 g/l and sulfate precipitated from such a low sulfate-containing chlorate liquor will tend to be non-glauberite species with increased chromate levels. Glauberite formation is favored with greater sulfate concentrations with the sulfate concentration is more preferably in the range from about 15 to 25 g/l for best results. Glauberite formation is also favored by removing only a portion of the sulfate during the treatment with a calcium-containing material. The removal of only the portion can maintain the sulfate concentration within the preferred range.

The maximum amount of sulfate that can be removed without a sharp increase in chromate contamination of the precipitate can vary with the overall chemical composition and temperature of the chlorate solution. Chemical, optical and X-ray crystallographic techniques can identify a point whereat glauberite ceases to be the predominant sulfate-containing precipitate. For example, in a chromate and sulfate-containing chlorate solution at 60° C., the sodium sulfate concentration should be above 9 g/l, preferably above about 10 g/l, while at 50° C. the sodium sulfate concentration should preferably be above about 13 g/l to favor glauberite formation. The total calcium ion addition is determined by the two to one stoichiometric ratio of sulfate to calcium in glauberite, $Na_2Ca(SO_4)_2$. Additional calcium beyond that required to form glauberite satisfies the solubility requirement of generally about 0.2 to 0.4 g/l.

Supersaturation by calcium ions in the solution can favor formation of non-glauberite species. Glauberite formation is further enhanced by techniques that reduce calcium ion supersaturation during calcium addition. Thus, the chlorate solution should be well agitated and the calcium-containing material should be added in a manner that avoids supersaturation or high localized calcium ion concentrations within the solution. For example, the calcium-containing material can be added in a batch system as several small portions at timed intervals, or in a continuous system at several stages or points in the chlorate sidestream. In one embodiment, the calcium-containing material can be added as an aqueous solution. For example, where the calcium-containing material is a readily dissolvable calcium compound such as calcium chloride and it can most suitably be added as an aqueous solution of the calcium chloride to avoid high localized calcium ion concentrations. Where the calcium-containing material is added as a solid calcium-containing compound, the compound is preferably a slow dissolving compound such as calcium sulfate dihydrate (gypsum). A slow dissolving calcium compound favors a high sulfate to calcium ratio during the dissolution of the calcium-containing compound, thus favoring glauberite formation. In contrast, a highly soluble and rapidly dissolving calcium-containing material such as solid calcium chloride can favor formation of non-glauberite phases by generation of initially high calcium ion levels.

The present invention is illustrated by the following examples which are illustrative only.

EXAMPLE I

A stock solution of synthetic chlorate liquor was prepared to contain 600 g/l sodium chlorate, 115 g/l sodium chloride, and 4.0 g/l sodium dichromate. An aqueous calcium chloride stock solution containing 29.6 weight percent calcium chloride was also prepared. The crystallizations were performed in two liter round bottom flask with a Teflon ® paddle type stirrer. The temperature was controlled by a thermostatted water bath at 60° C. One liter of the stock chlorate liquor was entered into the flask. The sodium sulfate concentration was adjusted to 20 g/l. The pH of this chlorate liquor was adjusted to a pH of 5.0 by addition of sodium hydroxide. A total of 7 g (about 5 milliliters) of the calcium chloride solution was added to the chlorate liquor in 5 portions at 0.5 hour intervals. Each portion (about 1 milliliter) was added dropwise over several minutes. The entire chlorate mixture was then maintained at 60° C. for 21.5 hours from the initial addition of calcium chloride. The resultant precipitate was removed from the chlorate liquor and analyzed by X-ray diffraction and microscopic examination. X-ray diffraction and optical microscopic examination indicated that glauberite was the crystalline form of the sulfate present. The crystals were observed to be nearly equant in shape. A chromium level of 100 ppm was analyzed by atomic absorption.

EXAMPLE II

One liter of the stock chlorate liquor was entered into a flask as in Example I. The sodium sulfate concentration was adjusted 20 g/l and the pH was adjusted to 5.0. An amount of 7.0 g of the calcium chloride solution was added in 5 equal portions at 0.5 hour intervals as in Example I. The mixture of chlorate liquor and calcium material was maintained at 60° C. for 4.0 hours from the time of the first calcium chloride addition. The resultant precipitate was separated and analyzed. Analysis as in Example I showed a chromium content of 120 ppm. Microscopic examination indicated the crystalline form as glauberite.

COMPARATIVE EXAMPLE I

One liter of the stock chlorate liquor was entered into a flask as in Example I. The sodium sulfate concentration was adjusted to 20 g/l and the pH was adjusted to 6.05. Calcium chloride solution was added as in Example I and the mixture of chlorate liquor and calcium material was maintained at 60° C. for 22.5 hours from the initial addition of calcium chloride. Analysis of the resultant precipitate as in Example I showed a chromium content of from 650 to 680 ppm. The precipitate was observed to be tan in color.

COMPARATIVE EXAMPLE II

One liter of the stock chlorate liquor was entered into a flask as in Example I. The sodium sulfate concentration was adjusted to 17 g/l. The pH was adjusted to 5.0. An amount of 7 g of the calcium chloride solution was added as a single slug and the chlorate liquor and calcium chloride were maintained at 60° C. for 5 hours. The resultant crystals were tan in color. Non-glauberite type crystals were observed as star-shaped crystals, needles and laths. Analysis as in Example I showed a chromium content of from 1140 to 1190 ppm.

COMPARATIVE EXAMPLE III

One liter of a chlorate liquor containing 600 g/l sodium chlorate, 115 g/l sodium chloride, 4 g/l sodium dichromate and 15 g/l of sodium sulfate was placed in a two liter flask as in Example I. The pH was adjusted to between about 5.2 and 5.5. An amount of 3.45 g of solid calcium chloride dihydrate flakes was added to the chlorate liquor. The mixture was maintained for just over 24 hours. Analysis of the resultant precipitate as in Example I showed a chromium content of 1830 ppm.

The data of the examples and the comparative examples demonstrates that chromium levels within the sulfate precipitate are reduced by removing sulfate from a chlorate solution as glauberite. Further, the advantages of periodic addition of the calcium-containing material and of an aqueous calcium chloride solution over solid calcium chloride in the process are evident.

Obviously many modifications and variations of the present invention are possible in light of the above disclosure. It is, therefore, to be understood that, within the scope of the appended claims, the invention may be practiced otherwise than as specifically described.

We claim:

1. A process of removing sulfate from aqueous alkali metal chlorate solutions comprising:
    (a) mixing a chromate and sulfate-containing aqueous alkali metal chlorate solution having a pH in the range from about 2.0 to about 6.0 with a calcium-containing material for a time and at a temperature sufficient to form a sulfate-containing precipitate, the precipitate being predominantly glauberite; and
    (b) separating the sulfate-containing precipitate from the solution.

2. The process of claim 1 wherein the sulfate-containing precipitate is substantially chromium-free.

3. The process of claim 1 wherein the pH is from about 4.0 to about 5.5.

4. The process of claim 1 wherein the calcium-containing material is an aqueous calcium chloride solution.

5. The process of claim 3 wherein the calcium-containing material is an aqueous calcium chloride solution.

6. The process of claim 1 wherein the calcium-containing material is gypsum.

7. The process of claim 4 wherein the calcium-containing material is added and mixed in periodic portions.

8. The process of claim 5 wherein the calcium-containing material is added and mixed in periodic portions.

9. A process of removing sulfate from an aqueous sodium chlorate solution containing sodium chloride, sodium dichromate and sodium sulfate, comprising:
   (a) mixing the aqueous sodium chlorate solution having a pH of between about 2.0 and about 6.0 with a calcium-containing material, thereby to precipitate a portion of the sulfate in the form of glauberite and non-glauberite species;
   (b) maintaining the resulting sodium chlorate solution and sulfate-containing precipitate at a temperature and for a time sufficient to substantially completely convert the non-glauberite species to glauberite; and
   (c) separating said glauberite from the sodium chlorate solution.

10. The process of claim 9 wherein the pH is between about 4.0 and 5.5.

11. The process of claim 9 wherein the calcium-containing material is an aqueous calcium chloride solution.

12. The process of claim 9 wherein the calcium-containing material is gypsum.

13. The process of claim 11 wherein the calcium-containing material is added and mixed in periodic portions.

14. The process of claim 13 wherein the glauberite is essentially chromium-free.

15. The process of claim 13 wherein the aqueous sodium chlorate solution contains from about 15 to 25 g/l sodium sulfate, and the resulting solution and precipitate is maintained at a temperature of from about 60° C. to 75° C. for at least 4 hours.

16. A process of reducing chromium contamination in a sulfate-containing precipitate from an aqueous chromate and sulfate-containing sodium chlorate solution comprising:
   (a) mixing the sodium chlorate solution having a pH of between about 2.0 and 6.0 with
   (b) a calcium-containing material for a time and at a temperature sufficient to form a sulfate-containing precipitate being substantially glauberite.

17. The process of claim 16 wherein the sulfate-containing precipitate is initially a mixture of glauberite and non-glauberite species and the mixture and the chlorate solution are maintained at a temperature of from about 60° C. to 75° C. for a period of at least 4 hours to substantially completely convert the non-glauberite species to glauberite species.

18. The process of claim 17 wherein the calcium-containing material is an aqueous calcium chloride solution and is added and mixed in periodic portions.

* * * * *